US009661561B2

United States Patent
Shu

(10) Patent No.: US 9,661,561 B2
(45) Date of Patent: May 23, 2017

(54) WIRELESS NETWORK DISCOVERY METHOD AND APPARATUS

(71) Applicant: Huawei Device Co., Ltd., Shenzhen, Guangdong (CN)

(72) Inventor: Guiming Shu, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 276 days.

(21) Appl. No.: 14/522,962

(22) Filed: Oct. 24, 2014

(65) Prior Publication Data

US 2015/0043562 A1 Feb. 12, 2015

Related U.S. Application Data

(63) Continuation of application No. PCT/CN2013/074706, filed on Apr. 25, 2013.

(30) Foreign Application Priority Data

Apr. 25, 2012 (CN) .......................... 2012 1 0123899
Apr. 25, 2012 (CN) .......................... 2012 1 0213398

(51) Int. Cl.
*H04W 48/16* (2009.01)
*H04W 88/08* (2009.01)
*H04W 48/14* (2009.01)

(52) U.S. Cl.
CPC ........... *H04W 48/16* (2013.01); *H04W 48/14* (2013.01); *H04W 88/08* (2013.01)

(58) Field of Classification Search
None
See application file for complete search history.

(56) References Cited

U.S. PATENT DOCUMENTS

2004/0117559 A1* 6/2004 Glasco ............... G06F 12/0822
711/141
2005/0047371 A1 3/2005 Bennett
(Continued)

FOREIGN PATENT DOCUMENTS

| CN | 102006653 A | 4/2011 |
| CN | 102413579 A | 4/2012 |

(Continued)

OTHER PUBLICATIONS

Wang Shuo et al; Wireless Local Area Network QoS (IEEE802.11E) Protocol Analyzing; CompoTech China; Sep. 30, 2004; total 10 pages.
(Continued)

*Primary Examiner* — Jenee Williams
(74) *Attorney, Agent, or Firm* — Huawei Device Co., Ltd.

(57) ABSTRACT

In a wireless network discovery operation, before a WiFi station sends a network probe request in a WiFi network to request for network information it needs to connect to an access point, it first listens to communications on a current channel of the WiFi network for a preset period of time. When the WiFi station receives on the current channel a network probe request message sent by another WiFi station, it further delays sending the first network probe request by a second time period, in anticipation of some signals from the access point. If during the second time period a network discovery message from the access point, such as a probe response or a beacon message, is detected and that message contains the network information needed, the WiFi station cancels the sending of its probe request. Otherwise, the WiFi station sends its probe request after the second time period expires.

24 Claims, 3 Drawing Sheets

(56) References Cited

U.S. PATENT DOCUMENTS

| | | | |
|---|---|---|---|
| 2005/0059353 A1* | 3/2005 | Smith | H04W 24/00 455/67.11 |
| 2005/0170780 A1* | 8/2005 | Furman | H04L 1/20 455/67.11 |
| 2005/0272420 A1* | 12/2005 | Matsuda | G06F 3/1203 455/426.2 |
| 2006/0062183 A1* | 3/2006 | Forte | H04W 36/0016 370/331 |
| 2006/0077946 A1* | 4/2006 | Adya | H04W 24/04 370/349 |
| 2006/0092888 A1* | 5/2006 | Jeong | H04W 48/14 370/338 |
| 2007/0002884 A1* | 1/2007 | Jaakkola | H04W 48/16 370/431 |
| 2007/0025296 A1* | 2/2007 | Jung | H04W 36/32 370/331 |
| 2007/0171910 A1* | 7/2007 | Kumar | H04L 63/0428 370/392 |
| 2007/0177549 A1* | 8/2007 | Lo | H04W 36/18 370/331 |
| 2007/0189216 A1* | 8/2007 | Wang | H04W 36/12 370/331 |
| 2007/0243888 A1* | 10/2007 | Faccin | H04W 48/14 455/461 |
| 2007/0243892 A1* | 10/2007 | Mikami | H04W 48/16 455/507 |
| 2007/0274211 A1* | 11/2007 | Tsubota | H04W 76/064 370/229 |
| 2008/0014934 A1 | 1/2008 | Balasubramanian et al. | |
| 2008/0056211 A1* | 3/2008 | Kim | H04L 29/12839 370/338 |
| 2008/0057936 A1 | 3/2008 | Oosawa | |
| 2008/0080387 A1* | 4/2008 | Wang | H04L 12/2697 370/252 |
| 2008/0080388 A1* | 4/2008 | Dean | H04L 12/2697 370/252 |
| 2008/0140794 A1* | 6/2008 | Rybak | G06Q 10/10 709/207 |
| 2008/0298333 A1 | 12/2008 | Seok | |
| 2009/0046682 A1* | 2/2009 | Kim | H04W 28/06 370/338 |
| 2009/0075653 A1* | 3/2009 | Yeom | H04W 72/02 455/434 |
| 2010/0002659 A1* | 1/2010 | Doi | H04B 7/2696 370/338 |
| 2010/0113042 A1 | 5/2010 | Kasslin et al. | |
| 2010/0234056 A1* | 9/2010 | Goto | H04W 8/005 455/515 |
| 2010/0284296 A1* | 11/2010 | Sakai | H04W 8/245 370/252 |
| 2010/0316043 A1* | 12/2010 | Doi | H04L 27/0006 370/350 |
| 2011/0044308 A1* | 2/2011 | Kawamura | H04W 76/043 370/338 |
| 2011/0243013 A1* | 10/2011 | Lee | H04W 24/10 370/252 |
| 2011/0280234 A1* | 11/2011 | Wentink | H04W 8/005 370/338 |
| 2011/0281556 A1* | 11/2011 | Choi | H04M 1/72583 455/411 |
| 2011/0307609 A1* | 12/2011 | Rangarajan | H04W 72/1252 709/225 |
| 2012/0099572 A1* | 4/2012 | Kato | H04W 88/06 370/338 |
| 2012/0106449 A1* | 5/2012 | Shibuya | H04W 12/06 370/328 |
| 2012/0124665 A1* | 5/2012 | Dubey | H04L 63/14 726/22 |
| 2012/0307685 A1* | 12/2012 | Kim | H04W 48/16 370/255 |
| 2013/0109314 A1* | 5/2013 | Kneckt | H04W 4/008 455/41.2 |
| 2013/0182611 A1* | 7/2013 | Kneckt | H04W 8/005 370/255 |
| 2013/0208701 A1* | 8/2013 | Cho | H04W 36/08 370/331 |
| 2013/0235852 A1* | 9/2013 | Segev | H04W 72/044 370/336 |
| 2013/0294270 A1* | 11/2013 | Yang | H04W 48/16 370/252 |
| 2013/0294354 A1* | 11/2013 | Zhang | H04W 72/04 370/329 |
| 2013/0336234 A1* | 12/2013 | Ghosh | H04W 72/10 370/329 |
| 2014/0079022 A1* | 3/2014 | Wang | H04W 36/22 370/331 |
| 2014/0146074 A1 | 5/2014 | Kwon | |
| 2015/0089386 A1 | 3/2015 | Brisebois | |

FOREIGN PATENT DOCUMENTS

| | | |
|---|---|---|
| CN | 102711220 A | 10/2012 |
| EP | 2320706 A1 | 5/2011 |
| EP | 2587848 A1 | 5/2013 |
| JP | 2008061110 A | 3/2008 |
| WO | 2008034846 A1 | 3/2008 |

OTHER PUBLICATIONS

Katsuo Yunoki: "Hybrid Scanning", IEEE11-12/0277r3, Mar. 13, 2012, total 3 pages.

Katsuo Yunoki: "Hybrid Scanning", IEEE 11-12/0277R2, Mar. 13, 2012, total 16 pages.

Alexandros Tsakountakis, "Towards effective Wireless Intrusion Detection in IEEE 802.IIi", XP031120078A, 2007, total 6 pages.

\* cited by examiner

WIRELESS NETWORK DISCOVERY METHOD AND APPARATUS

CROSS-REFERENCE TO RELATED APPLICATIONS

This application a continuation of International Application No. PCT/CN2013/074706, filed on Apr. 25, 2013, which claims priority to Chinese Patent Application No. 201210123899.7, filed with the Chinese Patent Office on Apr. 25, 2012, and Chinese Patent Application No. 201210213398.8, filed with the Chinese Patent Office on Apr. 25, 2012, which are incorporated herein by reference in their entireties.

TECHNICAL FIELD

The present invention relates to the field of wireless communications technologies, and in particular, to a wireless network discovery method and apparatus.

BACKGROUND

In an existing WiFi (Wireless Fidelity, Wireless Fidelity) technology, for an application scenario where a large number of WiFi STAs (station, station) simultaneously enter a WiFi AP (access point, access point) coverage area, before a corresponding STA and an AP establish a connection, the STA first needs to determine which WiFi APs corresponding to a WiFi network exist in the surrounding and select a WiFi AP meeting a requirement of the STA from these WiFi APs, and then executes a process of connecting to a WiFi network to which the corresponding WiFi AP belongs.

According to existing specifications, a WiFi STA may discover an AP by receiving a beacon (Beacon) message that is periodically sent by the AP by broadcasting, and may also discover a network by sending an active scan message. If an WiFi STA needs to discover a WiFi AP existing in the surrounding as soon as possible, the WiFi STA may broadcast a network probe request message (Probe request) and add, in the network probe request message, an information identifier corresponding to related information of one or more requested WiFi networks, that is, WiFi APs; and one or more APs receiving the Probe request in an adjacent area of the WiFi STA reply to the STA with a probe response message (Probe response) and include related information of the WiFi AP requested by the STA in the probe response message.

In the prior art, when broadcasting a Probe request, each STA needs to scan a plurality of channels supported by the STA one by one, send the Probe request through each channel, and wait to receive a Probe response generated by one or more APs in an adjacent area for a response. It can be seen that each Probe request causes that a plurality of APs in the adjacent area give a response and therefore generate a plurality of Probe responses. Therefore, for a scenario where a large number of STAs perform network discovery almost at the same time, at a network discovery stage, each channel of the STA is used for transmitting network discovery messages, that is, the Probe request and the Probe responses, most of the time.

It can be seen that for an application scenario where a large number of STAs wait to access a network, an existing WiFi network discovery mechanism causes that a large number of Probe request/response messages occupy a communication channel used by an STA and an AP, which largely reduces channel use efficiency.

SUMMARY

In view of this, embodiments of the present invention provide a wireless network discovery method and apparatus, so as to reduce the number of massive network probe request messages sent by an STA for network discovery, reduce the number of probe response messages generated due to the network probe request messages, and improve channel use efficiency at a wireless network discovery stage.

An embodiment of the present invention provides a wireless network discovery method, including:

before a station sends a first network probe request message to an access point, detecting a current channel; and when the station receives, on the current channel, a second network probe request message sent by another station, delaying, by the station, sending the first network probe request message; or canceling, by the station, sending the first network probe request message.

An embodiment of the present invention further provides a station, including:

a detecting module, configured to: before a first network probe request message is sent to an access point, detect a current channel, and when a second network probe request message sent by another station is received on the current channel, trigger a message delaying module;

the message delaying module, configured to delay sending the first network probe request message; and a message canceling sub-module, configured to cancel sending the first network probe request message.

In comparison with the prior art, in the embodiments of the present invention, when a station needs to perform wireless network discovery, the station does not directly and actively probe a wireless network by sending a network probe request message through a channel, but first detects a current channel and determines whether a network probe request message sent by another station is received on the current channel; and when discovering that the a network probe request message sent by another station is received on the current channel, the station reduces, by delaying sending a network probe request message, the number of network probe request messages sent by the station for network discovery, thereby reducing the number of probe response messages generated due to the network probe request messages and improving channel use efficiency.

BRIEF DESCRIPTION OF DRAWINGS

To describe the technical solutions in the embodiments of the present invention more clearly, the following briefly introduces the accompanying drawings required for describing the embodiments.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. Embodiments of the present invention provide a wireless network discovery method and apparatus, so as to reduce the number of massive network probe request messages sent by an STA for network discovery, reduce the number of probe response messages generated due to the network probe request messages, and improve channel use efficiency at a wireless network discovery stage.

To facilitate a full understanding of the technical solutions of the embodiments of the present invention, the following clearly and completely describes the technical solutions in the embodiments of the present invention with reference to the accompanying drawings in the embodiments of the present invention.

First, the following describes the wireless network discovery method provided by the embodiments of the present invention.

Figure 1:
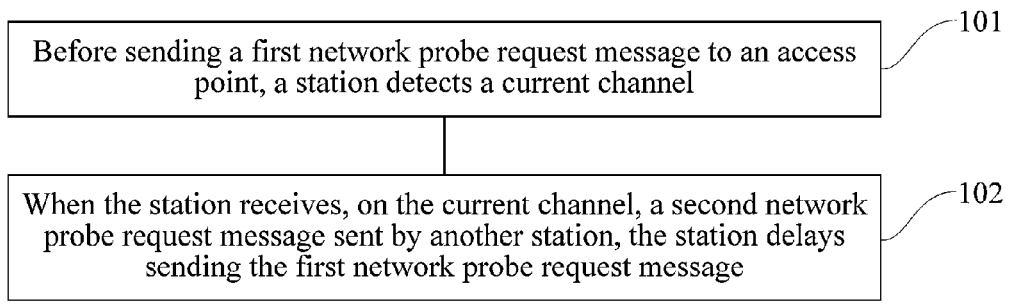
FIG. 1 is a schematic flowchart of a wireless network discovery method according to an embodiment of the present invention.

FIG. 1 shows a process of a wireless network discovery method provided by an embodiment of the present invention, where the method specifically includes the following steps:

Step 101: Before sending a first network probe request message to an access point, a station detects a current channel.

Step 102: When the station receives, on the current channel, a second network probe request message sent by another station, the station delays sending the first network probe request message.

The first network probe request message particularly refers to a network probe request message sent by the current station, and the second network probe request message particularly refers to a network probe request message sent by another one or more stations.

In the embodiment of the present invention, when a station needs to perform wireless network discovery, the station does not directly and actively probe a wireless network by sending a network probe request message through a channel, but first detects a current channel and determines whether a network probe request message sent by another station is received on the current channel; and when discovering that a network probe request message sent by another station is received on the current channel, the station reduces, by delaying sending a network probe request message, the number of network probe request messages sent by the station for network discovery, thereby reducing the number of probe response messages generated due to the network probe request messages and improving channel use efficiency.

It should be noted that in an exemplary embodiment of the present invention, an implementation manner in which the station delays sending the first network probe request message refers to: The station receives, on the current channel, a second network probe request message sent by another one or more stations; and when determining that the second network probe request message includes a network information identifier requested by the station, the station suspends sending the first network probe request message for a preset period of time starting with a moment when the second network probe request message is received, and waits to receive a second probe response message sent by a surrounding wireless network access point.

The preset period of time refers to a longest period of time required by a surrounding wireless network access point for sending a probe response message to a certain station after the surrounding wireless network access point receives a network probe request message sent by the station. In specific implementation, the wireless network access point may set a value of the preset period of time, or the station sending the network probe request message may set a value of the preset period of time and add the corresponding value of the preset period of time in the network probe request.

In addition, in another exemplary embodiment of the present invention, after the delaying, by the station, the first network probe request message, the method may further include:

during the preset period of time starting with a moment when the second network probe request message sent by the another station is received, if the station receives a second probe response message sent by a surrounding wireless network access point or another message used for wireless network discovery, and determines that the second probe response message or the another message used for wireless network discovery includes network information requested by the station, after the preset period of time is reached, not sending the first network probe request message, where the message used for wireless network discovery is sent by a surrounding wireless network access point and includes a message carrying wireless network information required by a station, and this type of message includes a beacon message (beacon) and the like.

Certainly, in specific implementation of the technical solutions of the present invention, application scenarios where the station needs to send the network probe request message may still exist. An example for these application scenarios is as follows: During the preset period of time, if the station determines that one or more second network probe request messages sent by another station and received by the station do not include the network information identifier requested by the station, and does not receive the another message used for wireless network discovery, after the preset period of time is reached, the station still needs to send the first network probe request message.

In addition, during the preset period of time, if the station does not receive the second probe response message sent by the surrounding wireless network access point, and does not receive the message used for wireless network discovery, after the preset period of time is reached, the station still needs to send the first network probe request message.

In the foregoing embodiment of the present invention, before sending a network probe request message, a station that needs to perform network discovery needs to detect to whether a network probe request message sent by another station exists on a channel. According to existing specifications, the station needs to parse each received physical layer frame, obtain a MAC (Media Access Control, media access control) layer frame included in the physical layer frame, and determine whether the current MAC layer frame is a network probe request message according to frame type information in a header of the MAC layer frame. However, the existing implementation manner may cause that the station consumes more electricity. To reduce parsing operations performed by the station on a non-network-probe-request message, the embodiment of the present invention provides the following solution: A station adds indication information to a header of a physical layer frame of a message sent by the station, where the indication information is used for indicating that the current message is a network probe request message. Specifically, the indication information is used for indicating whether a data part of the physical layer frame includes a MAC layer Probe request. In actual application, the indication information may occupy one or more Bits in the header of the physical layer frame, and a determined value is used for indicating whether the data part of the physical layer frame includes the MAC layer Probe request. In this way, the station only needs to parse a frame header part of each physical layer frame and then can learn whether the physical layer frame includes the Probe request according to the indication information included in the frame header, thereby avoiding an operation of further parsing the data part of the physical layer frame to obtain a MAC layer frame content type included in the physical layer frame, and reducing electricity consumption of the station. Certainly, after the station determines that the data part of the physical layer frame includes the MAC layer Probe request frame according to the indication information in the frame header of the physical layer frame, if the station needs to obtain request information content included in the Probe request frame, the station still needs to further parse the data part of the physical layer frame, so as to obtain the request information included in the MAC layer frame.

To facilitate an understanding of the technical solutions of the present invention, the following describes an overall solution in detail by using a specific example.

Figure 2:
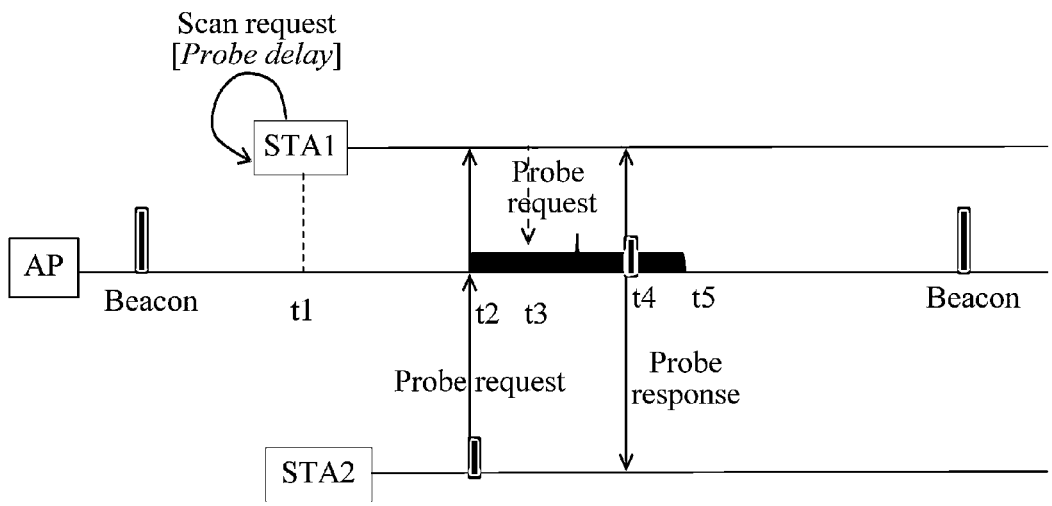
FIG. 2 is a schematic diagram of an application scenario where two stations perform wireless network discovery according to an embodiment of the present invention.

FIG. 2 shows a schematic diagram of an application scenario where two stations perform wireless network discovery. An AP is an access point, an STA1 and an STA2 are two stations that perform network discovery within a coverage area of the AP. To discover a WiFi network corresponding to the AP as soon as possible, the STA1 is triggered to perform active scanning on a WiFi network. A specific process is as follows: A station management entity (SME) triggers, by using a scan request message (Scan request), a MAC layer to send a network probe request message Probe request; and the station management entity adds a Probe delay parameter in the Scan request message, to indicate, to the MAC layer, that the MAC layer needs to wait for a period of time specified by the Probe delay before sending the network probe request message Probe request. In addition, according to a channel contention mechanism in WiFi specifications, before using a channel to send a message, each STA first needs to detect whether the channel is idle; when discovering that the channel is idle, starts a back-off time window, and continues to detect the channel in the back-off window; and if the channel is still idle when the back-off time window ends, sends a Probe request.

In this embodiment, it is assumed that the STA1 initiates the Scan request at a time point t1 by using the station management entity, where the period of time specified by the Probe delay parameter carried in the Scan request and a period of time of back-off are t3-t1 in total, where the period of time of back-off may be ignored in comparison with the period of time specified by the Probe delay parameter. That is, the STA1 sends the Probe request at a time point t3. In addition, when sending a Probe request, an STA generally adds one or more network information identifiers requested by the STA in the Probe request.

To reduce the number of massive Probe request messages sent by the STA and reduce the number of more probe responses caused by the Probe request messages at a network discovery stage, in the application scenario, if the STA1 that is to perform active network scanning receives a Probe request sent by another STA (for example, the STA2) during the period of time of channel detection (t3-t1) (it is assumed that during this period, no other message that can be used for network discovery is received), as shown in FIG. 2, it is assumed that the STA1 receives a Probe request sent by the STA2 at a time point t2, and the STA1 may further parse the Probe request message, obtain information requested by the STA2 and carried in the Probe request message, and determine whether a network information identifier requested by the STA2 includes a network information identifier requested by the STA1; if yes, the STA1 delays sending the Probe request message and waits to receive a Probe response message sent by the AP as a response to the STA2; if not, the STA1 needs to continue to send the Probe request message before the time point t3. In this embodiment, it is assumed that at a time point t4, the STA1 receives the Probe response message sent by the AP as a response to the STA2, and in this way, the number of probe request messages sent by the STA1 and the number of probe responses sent by the AP to the STA1 due to the probe request messages at the network discovery stage can be reduced. According to an existing mechanism, for a probe request sent by an STA, an AP needs to give a response and send a probe response during a preset period of time, and in this embodiment, the preset period of time is (t5-t2). Therefore, during the period of time specified by the AP for sending the probe response (before t5) as a response, if the STA1 does not receive the probe response sent by the AP as a response to the STA2 and does not receive another message that can be used for network discovery (such as a Beacon message periodically broadcast by the access point AP, or a probe response message actively sent by the AP or sent by the AP as a response to another STA), the STA1 still needs to contend for a channel to send the Probe request.

It should be noted that in the foregoing process, it is assumed that during the period of time of channel detection (t3-t1), the STA1 does not receive another message that can be used for network discovery (such as a Beacon message periodically broadcast by the access point AP, or a probe response message actively sent by the AP or sent by the AP as a response to another STA); however, during the period of time of channel detection, if another message that can be used for network discovery is received, such as a Beacon message periodically broadcast by the access point AP, or a probe response message actively sent by the AP or sent by the AP as a response to another STA, and it is determined that the message includes network information requested by the STA1, that is, a WiFi network meeting a requirement is discovered, the STA1 may cancel sending the Probe request.

It should be further noted that in the foregoing application scenario, if a plurality of Probe requests sent by other STAs are received before the time point t3, after parsing these Probe requests and obtains a plurality of network information identifiers requested by the STAs, if the STA1 discovers that a union of the network information identifiers carried in the plurality of Probe requests includes the network information identifier requested by the STA1, the STA1 may also delay sending the Probe request message and wait for Probe responses sent by the AP as a response to these STAs. It also should be noted that after the STA1 receives the Probe request of the STA2 at the time point t2, if before t5, the STA1 does not receive the Probe response sent by the AP as a response to the STA2 but receives one or more Probe responses sent by the AP to another STA (not the STA2), and the one or more Probe responses include the network information requested by the STA1, the STA1 cancels sending the Probe request message.

Certainly, in the foregoing application scenario, during the period of time of channel detection (t3-t1), if the STA1 does not receive the Probe request of the STA2 and does not receive another message that can be used for network discovery, the STA1 still needs to send the Probe request before the time point t3. In addition, during the period of time of channel detection (t3-t1), if the STA1 does not receive the Probe request sent by the STA2 but receives another message that can be used for network discovery, and the another message includes the network information requested by the STA1, the STA1 cancels sending the Probe request; otherwise, the STA1 still needs to send the Probe request before the time point t3.

It can be seen that in the foregoing embodiment, when a station needs to perform wireless network discovery, the station does not directly and actively probe a wireless network by sending a network probe request message through a channel, but first detects a current channel and determines whether a network probe request message sent by another station is received on the current channel; and when discovering that a network probe request message sent by another station is received on the current channel, the station reduces, by delaying sending a network probe request message, the number of network probe request messages sent by the station for network discovery, thereby reducing the number of probe response messages generated due to the network probe request messages and improving channel use efficiency.

Figure 3:
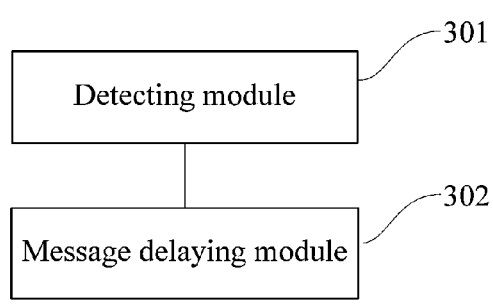
FIG. 3 is a schematic structural diagram of a station according to an embodiment of the present invention.

Corresponding to the foregoing method embodiment, the present invention further provides a station embodiment. As shown in FIG. 3, a station may specifically include:

a detecting module 301, configured to: before a first network probe request message is sent to an access point, detect a current channel, and when a second network probe request message sent by another station is received on the current channel, trigger a message delaying module 302; and the message delaying module 302, configured to delay sending the first network probe request message.

In this embodiment, when a station performs wireless network discovery, the station does not directly and actively probe a wireless network by sending a network probe request message through a channel, but first detects a current channel by using a detecting module and determines whether a network probe request message sent by another station is received on the current channel; and when discovering that a network probe request message sent by another station is received on the current channel, the station reduces, by delaying sending a network probe request message by using a message delaying module, the number of network probe request messages sent by the station for network discovery, thereby reducing the number of probe response messages generated due to the network probe request messages and improving channel use efficiency.

Figure 4:
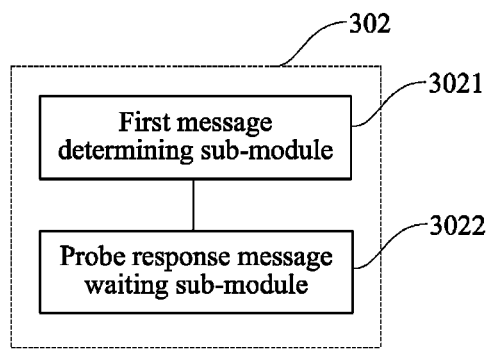
FIG. 4 is a schematic structural diagram of a message delaying module in FIG. 3.

In an exemplary embodiment of the present invention, as shown in FIG. 4, the message delaying module 302 includes:

a first message determining sub-module 3021, configured to determine whether the second network probe request message includes a network information identifier requested by the station; and a probe response message waiting sub-module 3022, configured to: when the first message determining sub-module 3021 determines that the second network probe request message includes information requested by the station, suspend sending the first network probe request message for a preset period of time starting with a moment when the second network probe request message is received, and wait to receive a second probe response message sent by a surrounding wireless network access point.

Figure 5:
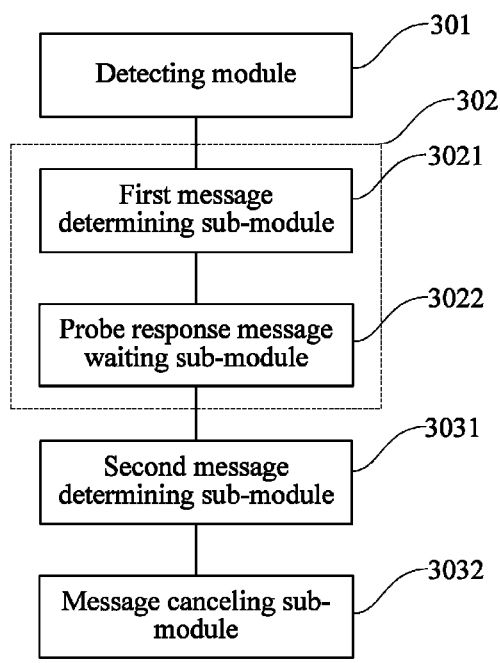
FIG. 5 is a schematic structural diagram of another station according to an embodiment of the present invention.

In another exemplary embodiment of the present invention, as shown in FIG. 5, the apparatus may further include:

a second message determining sub-module 3031, configured to: during the preset period of time, if the second probe response message or another message used for wireless network discovery is received, determine whether the second probe response message or the another message used for wireless network discovery includes network information requested by the station, where the message used for wireless network discovery includes a beacon message; and a message canceling sub-module 3032, configured to: when the second probe response message or the another message used for wireless network discovery includes the network information requested by the station, after the preset period of time is reached, not send the first network probe request message.

Figure 6:
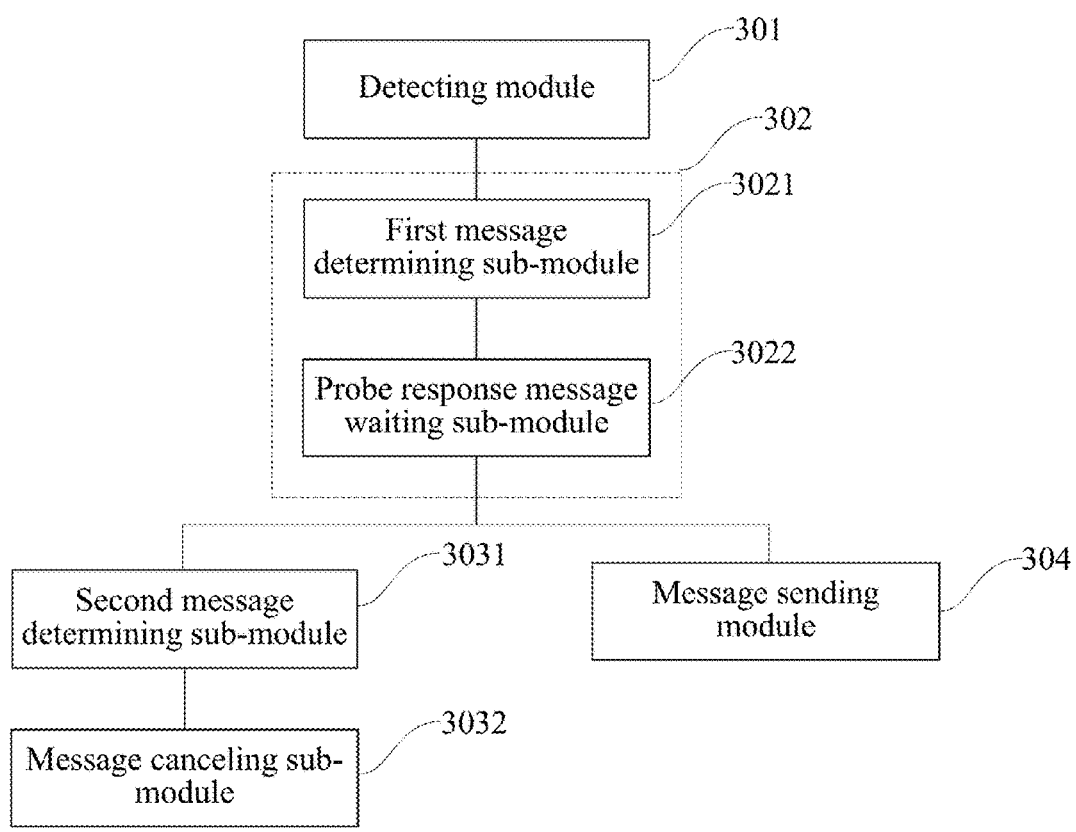
FIG. 6 is a schematic structural diagram of still another station according to an embodiment of the present invention.

In another station embodiment, as shown in FIG. 6, the apparatus may specifically further include:

a message sending module 304, configured to: during the preset period of time, if the second probe response message is received, the message used for wireless network discovery is not received, and it is determined that the second network probe request message does not include the network information identifier requested by the station, after the preset period of time is reached, send the first network probe request message.

Further, the message sending module may be further configured to: during the preset period of time, if the second probe response message is not received, and the message used for wireless network discovery is not received, after the preset period of time is reached, send the first network probe request message.

The apparatus embodiments are basically corresponding to the method embodiments and are therefore described briefly. For related content, reference may be made to the description of the method embodiments. The described apparatus embodiments are merely exemplary. The units described as separate parts may or may not be physically separated, and parts shown as units may or may not be physical units, that is, may be located in one position, or may also be distributed on a plurality of network units. A part or all of the modules may be selected according to actual needs to achieve the objectives of the solutions of the embodiments.

A person of ordinary skill in the art may understand that all or a part of the processes of the methods in the embodiments may be implemented by a computer program instructing relevant hardware. The foregoing program may be stored in a computer readable storage medium. When the program runs, the processes of the methods in the embodiments are performed. The storage medium may include: a magnetic disk, an optical disc, a read-only memory (Read-Only Memory, ROM), a random access memory (Random Access Memory, RAM), and the like.

According to the foregoing description of the disclosed embodiments, a person skilled in the art can implement or use the present invention. Various modifications made on these embodiments are obvious to a person skilled in the art, and a general principle defined in this specification may be implemented in other embodiments without departing from the spirit or scope of the embodiments of the present invention. Therefore, the embodiments of the present invention are not limited to the embodiments shown in this specification, but conform to a broadest scope consistent with the principles and novel features disclosed in this specification.

What is claimed is:

1. A method performed by a Wireless Fidelity (WiFi) station for discovering an access point in a WiFi network, comprising:
   receiving a scan request designated to trigger the WiFi station to send on a channel in a WiFi network a first probe request to request for network information required by the WiFi Station, the scan request indicating a delay time for postponing sending of the first probe request;
   listening to the channel during a first preset period of time, the first preset period of time comprising the delay time;
   upon detecting on the channel during the first preset period of time a second probe request sent by a second WiFi station and comprising a network information identifier corresponding to the network information required by the WiFi station, determining to further postpone sending the first probe request by a second preset period of time, the second preset period of time being set to include a time during which the access point needs to response to the second probe request;
   detecting a network discovery message from the access point during the second preset period of time;
   determining that the network discovery message comprises network information required by the WiFi station; and
   determining to cancel sending the first probe request when the network discovery message comprises the network information required by the WiFi station.

2. The method according to claim 1, wherein the first preset period of time further comprises a back-off time for the WiFi station to detect whether the channel is idle.

3. The method according to claim 1, wherein the network discovery message is a probe response or a beacon message.

4. The method according to claim 1, further comprising:
   identifying the second probe request according to indication information carried in a physical layer frame header of the second probe request.

5. A method performed by a Wireless Fidelity (WiFi) station for discovering an access point in a WiFi network, comprising:
   receiving a scan request designated to trigger the WiFi station to send a first probe request on a channel in a WiFi network to request for network information required by the WiFi Station, the scan request indicating a delay time for postponing sending of the first probe request;
   listening to the channel during a first preset period of time, the first preset period of time comprising the delay time;
   detecting a second probe request sent by a second WiFi station in the WiFi network on the channel during the first preset period of time;
   determining that the second probe request contains the network information required by the WiFi station; and
   determining to further postpone sending the first probe request till a second preset period of time expires when the second probe request comprising a network information identifier corresponding to the network information required by the WiFi station, wherein the second preset period of time includes a time during which the access point need to response to the second probe request.

6. The method according to claim 5, wherein the first preset period of time further comprises a back-off time for the WiFi station to detect whether the channel is idle.

7. The method according to claim 5, further comprising:
   during the second preset period of time, detecting a network discovery message from the access point;
   determining that the network discovery message comprises network information required by the WiFi station; and
   determining to cancel sending the first probe request when the network discovery message comprises network information required by the WiFi station.

8. The method according to claim 5, further comprising:
   sending the first probe request after the second preset period of time expires, when during the second preset period of time no network discovery message from the access point containing network information required by the WiFi station is detected.

9. The method according to claim 5, further comprising:
   identifying the second probe request according to indication information carried in a physical layer frame header of the second probe request.

10. A method performed by a Wireless Fidelity (WiFi) station for discovering an access point in a WiFi network, comprising:
    receiving a scan request designated to trigger the WiFi station to send a first probe request on a channel in a WiFi network to request for network information required by the WiFi Station, the scan request indicating a delay time for postponing sending of the first probe request;
    listening to the channel during a first preset period of time, the first preset period of time comprising the delay time; and
    detecting on the channel during the first preset period of time a network discovery message from the access point comprising network information required by the WiFi station; and determining, upon detecting the network discovery message, to cancel sending the first probe request.

11. The method according to claim 10, wherein the first preset period of time further comprises a back-off time for the WiFi station to detect whether the channel is idle.

12. The method according to claim 10, wherein the network discovery is a probe response or a beacon message.

13. A method performed by a Wireless Fidelity (WiFi) station for discovering an access point in a WiFi network, comprising:
    receiving a scan request designated to trigger the WiFi station to send on a channel in a WiFi network a first probe request to request for network information required by the WiFi station, the scan request indicating a delay time for postponing sending of the first probe request;
    listening to the channel during a first preset period of time, the first preset period of time comprising the delay time indicated by the scan request; and
    sending the first probe request after the first preset period of time expires, when during the first preset period of time the WiFi Station does not detect on the channel a second probe request sent by a second WiFi station in the WiFi network or a network discovery message from the access point that contains the network information required by the WiFi station.

14. The method according to claim 13, wherein the first preset period of time further comprises a back-off time for the WiFi station to detect whether the channel is idle.

15. The method according to claim 13, wherein the network discovery message is a probe response or a beacon message.

16. A Wireless Fidelity (WiFi) station, comprising:
a memory; and
a processor coupled to the memory, wherein the processor is configured to:
receive a scan request designated to trigger the WiFi station to send a first probe request on a channel in a WiFi network to request for network information required by the WiFi Station, the scan request indicating a delay time for postponing sending of the first probe request;
listen to the channel during a first preset period of time, the first preset period of time comprising the delay time;
detect a second probe request sent by a second WiFi station in the WiFi network on the channel during the first preset period of time;
determine that the second probe request contains the network information required by the WiFi station; and
determine to further postpone sending the first probe request till a second preset period of time expires when the second probe request comprising a network information identifier corresponding to the network information required by the WiFi station, wherein the second preset period of time includes a time during which the access point need to response to the second probe request.

17. The station according to claim 16, wherein the first preset period of time further comprises a back-off time for the WiFi station to detect whether the channel is idle.

18. The station according to claim 16, wherein the processor is further configured to:
during the second preset period of time, detect a network discovery message from the access point;
determine that the network discovery message comprises network information required by the WiFi station; and
determine to cancel sending the first probe request when the network discovery message comprises network information required by the WiFi station.

19. The station according to claim 16, wherein the processor is further configured to:
send the first probe request after the second preset period of time expires, when during the second preset period of time no network discovery message from the access point containing network information required by the WiFi station is detected.

20. The station according to claim 16, wherein the processor is further configured to:
identifying the second probe request according to indication information carried in a physical layer frame header of the second probe request.

21. A Wireless Fidelity (WiFi) station, comprising:
a memory; and
a processor coupled to the memory, wherein the processor is configured to:
receive a scan request designated to trigger the WiFi station to send on a channel in a WiFi network a first probe request to request for network information required by the WiFi station, the scan request indicating a delay time for postponing sending of the first probe request;
listen to the channel during a first preset period of time, the first preset period of time comprising the delay time indicated by the scan request;
send the first probe request after the first preset period of time expires, when during the first preset period of time the WiFi Station does not detect on the channel a second probe request sent by a second WiFi station in the WiFi network or a network discovery message from the access point that contains the network information required by the WiFi station.

22. The station according to claim 21, wherein the first preset period of time further comprises a back-off time for the WiFi station to detect whether the channel is idle.

23. The station according to claim 21, wherein the network discovery message is a probe response or a beacon message.

24. The station according to claim 21, wherein the processor is further configured to:
detect on the channel during the first preset period of time, a network discovery message from the access point comprising network information required by the WiFi station; and
determine upon detecting the network discovery message to cancel sending the first probe request.

* * * * *